United States Patent Office 3,532,769
Patented Oct. 6, 1970

3,532,769
HEAT-HARDENABLE BINDERS FOR COATING COMPOSITIONS
Horst Dalibor and Hans-Joachim Kiessling, Hamburg, Germany, assignors to Reichhold Chemicals, Inc., White Plains, N.Y.
No Drawing. Filed Mar. 10, 1967, Ser. No. 622,080
Claims priority, application Germany, Mar. 28, 1966, R 42,944
Int. Cl. C08f *15/36;* C08g *37/32*
U.S. Cl. 260—855                                             13 Claims

ABSTRACT OF THE DISCLOSURE

The present invention relates to heat-hardenable binders having as a basis mixtures consisting of etherified aminoplasts and reaction products of copolymers and polyols that are soluble in organic solvents, the copolymers being prepared from $\alpha,\beta$-unsaturated dicarboxylic acid anhydrides, aromatic vinyl compounds, methacrylic acid esters, acrylic acid esters and/or fumaric acid esters. More particularly, the binders according to the present invention contain (a) 50 to 95% by weight of soluble reaction products of copolymers which have been prepared by heating at reaction temperatures, preferably less than 20 mole percent and not more than 25 percent of $\alpha,\beta$-unsaturated dicarboxylic acid anhydride and styrene, vinyltoluene, vinylxylene or nuclear-halogenated styrenes, methacrylic acid esters, acrylic acid ester and/or fumaric acid ester, with tri- to hexavalent alcohols, if necessary together with mono- or dialcohols, to an acid number of 5 to 60, preferably 20 to 50, and a hydroxyl number of 20 to 120, preferably 30 to 90, and (b) 5 to 50% by weight of urea- or aminotriazine-formaldehyde resins etherified with alcohols.

RELATED APPLICATIONS

The present application is related to the following: (1) U.S. application Ser. No. 622,039, filed Mar. 10, 1967, corresponding to German application R 42,945, filed Mar. 28, 1966 (2054); (2) U.S. application Ser. No. 622,112, filed Mar. 10, 1967, corresponding to German application R 42,946, filed Mar. 28, 1966 (2055); (3) U.S. application Ser. No. 622,090, filed Mar. 10, 1967, now Pat. No. 3,474,076, granted Oct. 21, 1969, corresponding to German application R 42,947, filed Mar. 28, 1966 (2056); and (4) U.S. application Ser. No. 622,041, filed Mar. 10, 1967, corresponding to German application R 42,948, filed Mar. 28, 1966 (2057).

Heat-hardenable binders for coating compositions consisting of aminotriazine formaldehyde resins and plasticizing components having hydroxyl and carboxyl groups are known. As the plasticizing component it was customary to use therewith condensation resins of low molecular weight or high molecular weight polymers having thermoplastic properties.

German Pat. 544,326 describes the preparation of anhydride groups-containing polymers reacted with mono- and polyols. However, soluble anhydride groups-containing polymers reacted with mono- or dialcohols are unimportant as binders for coating compositions, particularly for lacquer raw materials, since even combinations thereof with urea- or aminotriazine-formaldehyde resins resulted in coatings having insufficient resistance to solvents, water and bases. Soluble anhydride groups-containing copolymers of the kind reacted only with triols could not, however, be obtained by the process of German Pat. 544,326.

Copolymers, as described in the examples of the aforesaid German patent, having a content of 30 and more percent by weight of maleic acid anhydride in the copolymer, yield insoluble products upon being reacted solely with trivalent alcohols, before achieving compatibility with urea- or aminotriazine-formaldehyde resins.

It has now been found that it is possible to obtain products that are suitable for coating compositions if the component (a) contains reaction products of polyols and copolymers that have preferably at least 1% and preferably less than 20 mole percent by weight of $\alpha,\beta$-unsaturated dicarboxylic acid anhydride and not more than 25% by weight, and component (b) is in the form of aminotriazine-formaldehyde resins. Suitable as component (a) are reaction products of copolymers and polyols such as tri- to hexavalent alcohols, if necessary together with mono- and dialcohols.

Moreover, it was found that reaction products (a), particularly suitable for use in combination with etherified aminotriazine-formaldehyde resins as binders for coating compositions, are those wherein the copolymers are reacted with trivalent alcohols, without the use of mono- and divalent alcohols. Outstanding properties were found in the case of reaction products (a) wherein the polyols are trivalent alcohols and, more particularly, those that are less polar then glycerin, as for example hexanetriol-1,2,6 or trimethylolalkane. Of the latter, the most suitable for the preparation of the reaction products (a), that constitute the components of the combinations used in accordance with the present invention, are those wherein for each mole of anhydride in the copolymer there are used 0.8 to 1.5 mole, preferably 0.8 to 1.2 mole of trimethylol-propane.

By the partial reaction for the preparation of component (a) from copolymers having a content of at least 1 but preferably less than 25 mole percent, preferably of 5 to 10 mole percent of an $\alpha,\beta$-unsaturated dicarboxylic acid anhydride, with polyols of the aforesaid type, it is possible to obtain soluble reaction products which, aside from an acid number of 5 to 60, preferably of 20 to 50, possess an hydroxyl number of 20 to 120, preferably of 30 to 90.

For the heat-hardenable coating compositions according to the present invention, the content of free hydroxyl groups possessed by the component (a) is a prerequisite for the combination and compatibility with aminoplast resins particularly the aminotriazine-formaldehyde resins, and for the cross-linking reactions with the methylol- or methylolether groups, which take place upon heating and which are promoted by the free carboxyl groups.

In the copolymers to be reacted with triols, it is possible to use instead of maleic acid anhydride other $\alpha,\beta$-unsaturated dicarboxylic acid anhydrides, such as itaconic acid anhydride. When maleic anhydride is used it should be less than 20% by weight and when itaconic acid is employed it should be not greater than 25% by weight.

For the use as binders in coating formulations in accordance with the present invention, the structure as well as the composition of the starting polymers that serve to prepare the component (a) is of considerable importance. Aside from $\alpha,\beta$-unsaturated dicarboxylic acid anhydrides, the following monomers can be used for the preparation of the copolymers: styrene, vinyltoluene, acrylic acid esters, methacrylic acid esters and fumaric acid esters, each having 1 to 10 carbon atoms in the alcohol component thereof. The selection of the comonomer mixture depends upon the particular use contemplated for the copolymer reacted with polyols as binders for coating compositions and, based upon the nature of the rigid or flexible surfaces to be coated, must generally conform to the desired properties such as hardness and elasticity.

Monomers that impart hardness properties to the starting polymers are for example aromatic vinyl hydrocarbons, such as styrenes and nuclear-halogenated styrenes as well as methacrylate. Acrylic acid esters having two or more carbon atoms in the alcohol portion thereof, methacrylic and fumaric acid esters with four and more carbon atoms in the alcohol portion thereof, when used as comonomers, generally produce softness and flexibility in the copolymer if the alcohol portion in these monomers is not branched.

The copolymers serving as a basis for the present novel coating compositions are prepared in known manner at raised temperatures, preferably in aromatic solvents, for example in xylene or high-boiling mixture of aromatics. The reaction takes place in a temperature range between 50 and 250° C. preferably from 90 to 170° C., by a free radical-polymerization process. This process is carried out in the presence of catalysts yielding free radicals such as peroxides, as for example benzoyl peroxide, di-tert.-butyl-peroxide or azo compounds. However, the reaction can also be carried out thermally at higher temperatures. When using low-boiling copolymerizable monomers, or monomers that are gaseous at room temperature, it is necessary to operate under pressure. In carrying out the process according to the present invention, it is generally preferred to effect the reaction with the polyols in a solvent that is the same as the solvent used for the polymerization of the monomers. In addition to the preferred aromatic solvents used, it is possible to operate in the presence of other solvents which do not participate, or only participate to a small extent, in the esterification reaction, as for example, aliphatic hydrocarbons, ketones, esters and tertiary alcohols.

The viscosities of the solutions of the starting polymers, measured in 60% solutions at 20° C. on the Gardner-Holdt scale, may lie within the whole range of this scale. Products having Gardner viscosities from A to D should be classified as copolymers of low molecular weight, those having viscosities from E to Y copolymers of average molecular weight, and those with viscosities from Y to $Z_2$ copolymers of high molecular weight.

Since the reaction between the copolymers, in a solution of aromatics, and the polyols requires at higher temperatures relatively long periods, the content of free hydroxyl groups gives rise, possibly as side reactions, to reesterifications between these and the ester groups that are brought into the copolymer, for example, by the use of acrylic acid or methacrylic acid alkylesters, or fumaric acid dialkylesters. Methacrylic acid esters have less tendency to undergo reesterification than acrylic acid and fumaric acid esters. The extent of the reesterification also depends upon the nature of the alcohol that is combined in the monomers in the form of esters. Methanol is split off more readily than ethanol, and so on. Ester groups with secondary or tertiary alcohols show only slight or no tendency toward reesterification. These reesterification reactions are of importance in the selection of the copolymer for the reaction with trivalent alcohols. The copolymers having high molecular weights should not contain groups that are inclined to reesterify since this would produce, in the course of the triol reaction, a certain amount of gel formation due to cross-linking, before achieving compatibility with the melamine resins. The reesterifications must, therefore, be confined to limits above which it is not possible to avoid the formation of insoluble or gel-like reaction products due to cross-linking, before achieving compatibility with the melamine resins.

In general, it is possible to achieve the desired hardness through the inclusion of copolymerized styrene or methylmethacrylate and the flexibility through the inclusion of copolymerized acrylic and/or fumaric acid esters wherein the carbon chain in the alcohol component contains more than four carbon atoms.

The alkylated aminoplasts contained in the heat-hardenable binder of the present invention as component (b) thereof in accordance with the present invention are prepared by alkylation of a condensation product obtained from an aldehyde and urea, N,N'-ethyleneura, dicyandiamide or aminotriazines, by means of an alkanol containing 1 to 6 carbon atoms. It is possible to use an alkylated aminoplast on condition that it is soluble that it is soluble in the organic solvent used for the preparation of the coating composition. In general, the alkylated aminoplast should contain at least 80%, and preferably 100% methylol group, which are alkylated with an alkanol having 1 to 6 carbon atoms. It is preferred to use alkylation products that were obtained with alkanols having 3 to 6 carbon atoms. The butylated products are particularly desirable because of their greater compatibility with a large number of polyol reaction products and solvents.

Aminotriazines contained in component b suitable for the preparation of the aminoplast are: melamine, acetoguanamine, benzoguanamine, formoguanamine, ammeline, 2-chloro - 4,6 - diamino-1,3,5-triazine, 2-phenyl-p-hydroxy-4,6 - diamino - 1,3,5-triazine, 6-methyl-2,4-di-amino-1,3,5 - triazine, 2,4,6 - trihydrazine-1,3,5-triazine, 2,4,6 - triethyl-triamino-1,3,5-triazine or N,N-di-($C_1$-$C_4$)-alkylmelamine, such as N,N-dimethylmelamine. As the aldehyde, although most aldehydes are suitable, such as acetaldehyde, crotonaldehyde and acrolein, it is preferred to use condensation products prepared with reversible polymers of formaldehyde, such as paraformaldehyde.

The copolymers reacted with the polyols constituting component (a) and the aminoplasts constituting component (b) are dissolved in an organic solvent in a ratio of 50 to 95 parts of copolymer to 50 to 5 parts of aminoplast. The quantitative relations of component (a) and alkylated aminoplast must be chosen in such a way that the two components are compatible in the coating solution as well as in the finished film. It is possible to use any desired concentration of the copolymer as component (a) and of the aminoplast as component (b) in the solvent, for example, from 1 to 60% by weight. If a pigment is present, the total content of the solids in the coating composition should lie between 5 and 75% by weight. The ratio of pigment to binder, i.e., component (a) plus component (b), can lie between 1:20 and 20:1.

As solvents it is possible to use: hydrocarbons, such as benzene, toluene, xylene and aromatic naphthenes or mixtures of such solvents; esters, such as ethyl, butyl, amyl, ethoxyethyl or methoxyethyl acetate, lactate or propionate; ketones, such as acetone, methylisopropyl-ketone methylisobutylketone, dioxane, isophoronehexanone or cyclohexanone; alcohols, such as n-butanol, t-butanol, isopropyl alcohol, n-propyl alcohol, amyl alcohol and cyclohexanol: ethers, such as diethylether, the monoethyl, monomethyl and monobutylether of ethylenglycol and various other solvents, such as dimethylformamide, dimethylacetamide, acetonitrile, nitromethane, nitroethene, nitropropane or nitrobutane, as well as mixtures of two or more solvents belonging to the same group as well as of several or all of the groups mentioned above.

As pigments it is possible to incorporate: inorganic pigments, such as chrome yellow, Prussian blue, Brunswick green; titanium pigments, such as titanium dioxide, extended titanium pigments (which are extended either with precipitated or natural fillers, such as alkaline-earth metal sulfates, as for example, calcium sulfate and barium sulfate); toned titanium pigments, titanates, such as barium, zinc, lead and magnesium titanate. Also other types of inorganic pigments can be used, for example, zinc sulfide pigments, such as zinc sulfide, lithopone, extended zinc sulfide pigments, such as lithopone with a calcium basis, zinc sulfide, zinc oxide or antimony oxide extended with natural fillers; or organic pigments, i.e., organic dyes that are free of sulphonic or carboxylic acid groups or other groups that impart water-solubility. The expression "pigment" also embraces other water-insoluble organic dyes, as for example, the calcium or barium lacquers of azo lacquer dyes.

The new coating compositions can be applied to the substrate in any desired fashion, for example, by brushing, spraying, dipping or rolling on. They are then dried and hardened by heating. In general, it is not necessary to add curing catalysts. However, an acid catalyst can be added, if necessary. The amount of such a catalyst may lie between 0.1 and 1% by weight based upon the weight of the aminoplast. The use of a curing catalyst may be appropriate when it becomes necessary to apply low hardening temperatures. When curing catalysts are used, it is possible to achieve insolubility simply by drying and aging at room temperature. The catalysts used for the hardening treatment to set up the compositions according to the present invention, can be any acid catalyst, including all organic and inorganic acid catalysts. For example, it is possible to use a catalytic amount of sulfuric or hydrochloric acid or the salts thereof, as for example, ammonium sulfate or ammonium chloride, or an organic acid, such as acetic acid, phthalic acid, benzoic acid, toluene sulfonic acid, naphthalenesulfonic acid or the monosalt of maelic acid with triethylamine.

The drying of the coatings can be effected at raised temperatures, for example, 60 to 104° C. The hardening can be carried out at 80 to 230° C., whether or not a catalyst is present. The hardening period may lie in the upper temperature range of about 230° C. between ½ and 2 minutes and in the lower temperature range of about 80° C. between 1 and 2 hours. However, it is particularly advantageous to effect the hardening for 15 to 30 minutes at 120 to 130° C.

EXAMPLE 1

(A) Preparation of component (a) contained in the coating composition.—24 parts by weight of laurylmercaptan and 944 parts by weight of an aromatic solvent mixture having boiling ranges from 150 to 170° C. are introduced into a three-necked flask equipped with a stirrer, thermometer and reflux cooler, and heated to 130 to 140° C. A mixture consisting of 16 parts by weight of di-tert.-butyl peroxide, 280 parts by weight of styrene, 420 parts by weight of methylmethacrylate, 106 parts by weight of maleic acid anhydride and 590 parts by weight of 2-ethylhexylacrylate, is then added within a period of 2 hours and polymerized for an additional 4 hours. The body content of the solution amounts to 61% and the viscosity corresponds to that of X and Y on the Gardner-Holdt scale. The resin solution is clear at room temperature.

The resin is incompatible with melamine-formaldehyde resins, even after being baked (ratio 70:30). 1000 parts by weight of the 61% resin solution are mixed with 62 parts by weight of trimethylolpropane and heated under reflux at about 168 to 172° C. After a reaction period of 6 hours, the reaction product was found to be compatible with melamine-formaldehyde resins after being baked. The product is now diluted with isobutanol to a body content of 50%. The viscosity of the 50% solution was approximately that of U on the Gardner-Holdt scale, whereas the acid number was 35 and the hydroxyl number about 75.

(B) Preparation of the heat-hardenable coating composition totaling up to 70% of copolymer to 30% of melamine resin.—700 parts by weight of the reaction product according to Example 1A were mixed at room temperature with 300 parts by weight of an isobutanol-etherified melamine-formaldehyde resin constituting component (b) prepared in accordance with German Pat. No. 1,127,083.

The melamine resin used was prepared by the process described in Example 1 of German Pat. 1,127,093 in such a way that, after the separation of water, it had a viscosity of A-B on the Gardner-Holdt scale, the excess isobutanol being then distilled off and replaced with xylene until the solution had a solids content of 50 to 52% by weight and a viscosity of 50 to 70 DIN-seconds at 20° C.

This mixture consisting of reaction product (a) and the melamine resin solution and 340 grams of TiO₂ (rutile) was made into a lacquer by grinding which was diluted with butyl-acetacte to a spraying viscosity of 20 DIN-seconds. It was applied to phosphated sheet metal and baked for 30 minutes at 130° C. The film had an excellent gloss, great flexibility, good surface hardness as well as a good resistance to xylene.

EXAMPLE 2

(A) Preparation of component (a) contained in the coating composition.—In the same way as explained in Example 1A, 24 parts by weight of lauryl mercaptan, 944 parts by weight of a mixture of aromatic solvents having boiling ranges of 150 to 170° C., are heated to 130 to 140° C., whereupon a mixture consisting of 16 parts by weight di-tert.-butylperoxide, 560 parts by weight of styrene, 140 parts by weight of methylmethacrylate, 106 parts by weight of maleic acid anhydride and 590 parts by weight of 2-ethylhexylacrylate is added within a period of 4 hours and polymerized for an additional 2 hours.

The body content of the solution amounts to 60% and the viscosity corresponds to that of W to X on the Gardner-Holdt scale. The resin solution is clear at room temperature.

The resin is incompatible with melamine-formaldehyde resins, even after being baked (ratio 70:30).

1000 parts by weight of the 60% resin solution are mixed with 62 parts by weight of trimethylol-propane and are heated under reflux to about 168 to 172° C. After a reaction period of 7 hours, the reaction product was found to be compatible with melamine-formaldehyde resins after being baked. The product is now diluted with isobutanol to a body content of 50%. The viscosity of the 50% solution was approximately that of W to X on the Gardner-Holdt scale, whereas the acid number was 37 and the hydroxyl number about 65.

(B) Preparation of the coating composition totaling up to 66.6% of reaction product according to Example 2A to 33.3% melamine resin.—666 grams of the reaction product prepared according to Example 2A, 333 grams of the 50% solution of isobutanol-etherified melamine-formaldehyde resin described in Example 1 and 340 grams of TiO₂ (rutile) are made into a lacquer by grinding, which is then diluted with butylacetate to a spraying viscosity of 20 DIN-seconds. It was applied to phosphated sheet metal and baked thereon for 30 minutes at 140° C. The film obtained in this manner, upon being treated for 10 hours at 90° C. with a 1% alkaline alkylarylsulfonate washing liquer, did not show a decrease of gloss or the formation of blisters.

EXAMPLE 3

(A) Preparation of component (a) contained in the coating composition.—In the same way as explained in Example 1A, 24 parts by weight of laurylmercaptan, 944 parts by weight of a mixture of aromatic solvents having boiling ranges of 150 to 170° C., are heated to 150 to 170° C., whereupon a mixture consisting of 16 parts by weight of di-tert.-butylperoxide, 280 parts by weight of styrene, 350 parts by weight of methylmethacrylate, 106 parts by weight of maleic acid anhydride and 670 parts by weight of butylacrylate is added within a period of 4 hours and polymerized for another 2 hours.

The body content of the solution amounts to 60% and the viscosity corresponds to that of V to W on the Gardner-Holdt scale. The resin solution is clear at room temperature.

The resin is incompatible with melamine-formaldehyde resins, even after being baked (ratio 70:30).

1000 parts by weight of the 60% resin solution are mixed with 62 parts by weight of trimethylol-propane and are heated under reflux to about 168 to 172° C. After a reaction period of 8 hours, the reaction product was found to be compatible with melamine-formaldehyde resins after being baked. The product is now diluted with isobutanol to a body content of 50%. The viscosity of the 50% solution was approximately that of U to V on the Gardner-Holdt scale, whereas the acid number was 36 and the hydroxyl number about 75.

(B) Preparation of the coating composition totaling up to 70% of component (a) to 30% of melamine resin.—700 grams of the reaction product prepared according to Example 3A, 300 grams of the 50% solution of isobutanol-etheified melamine-formaldehyde resin described in Example 1, constituting component (b), and 340 grams of TiO$_2$ (rutile) are made into a lacquer by grinding which is then diluted with butyl acetate to a spraying viscosity of 20 DIN-seconds. After applying it to phosphated sheet metal it was baked theren for 30 minutes at 130° C. The film obtained in this manner, upon being treated for 1 hour with xylene did not show diminished gloss.

It is preferred to use as components for the binder according to the present invention, reaction products of copolymers and tri- to hexavalent alcohols where the copolymerized acrylic acid ester and/or fumaric acid ester are those that were copolymerized in the form of monomers such as dibutylfumarate, di-2-ethylhexylfumarate, bnutylacrylate and 2-ethylhexylacrylate.

We claim:

1. A binder suitable for forming heat-hardenable coating compositions soluble in organic solvents, comprising a blend of (A) 50 to 95% by weight of a soluble reaction product of the following reaction (1) a copolymer prepared by heating at reaction temperature the following ingredients (a) 1–25% by weight of an α,β-unsaturated dicarboxylic acid anhydride and (b) at least one monomer of a group consisting of styrene, vinyltoluene, vinylxylene and nuclear-halogenated styrenes, and (c) at least one alkyl esters selected from a group consisting of alkylmethacrylate, alkylacrylate and dialkylfumarate, wherein the alkyl radical contains from 1 to 10 carbon atoms with (2) a trihydric alcohol, until an acid number of 5 to 60, and an hydroxyl number of 20 to 120 is obtained, and (B) 5 to 50% by weight of an aminoplast selected from a group consisting of urea-formaldehyde and aminotriazine-formaldehyde resins etherified with alcohols.

2. A binder according to claim 1 wherein (2) includes in addition to the trihydric alcohol, at least one member of a group consisting of mono- and dialcohols.

3. A binder according to claim 1 wherein component (A) has an acid number of 20–50.

4. A binder according to claim 1 wherein component (A) has an hydroxyl number of 30–90.

5. A binder according to claim 1 wherein ingredient (a) comprises maleic anhydride.

6. A binder according to claim 1 wherein ingredient (a) comprises 5–10% by weight of maleic anhydride.

7. A binder according to claim 1 wherein ingredient (a) comprises itaconic acid anhydride.

8. A binder according to claim 1 wherein ingredient (a) comprises 6–12% by weight of itaconic acid anhydride.

9. A binder according to claim 1 wherein the proportion of the reactants in (2) is from .8–1.8 moles of alcohol per mole of the anhydride reactant (1).

10. A binder according to claim 9 wherein the proportion of reactants is from .8–1.2 moles of alcohol per mole of the anhydride reactant (1).

11. A binder according to claim 1 wherein reactant (2) is selected from a group consisting of trimethylol propane, trimethylolethane and hexanetriol-1,2,6 and mixtures thereof.

12. A binder according to claim 1 wherein component (B) comprises a melamine formaldehyde resin etherified with butanol.

13. A binder according to claim 1 which is characterized in that as component (A) it contains reaction products obtained from 5 to 10% by weight of maleic acid anhydride and from monomers selected from the group consisting of 10% to 50% by weight of styrene, 0 to 50% by weight of alkylmethacrylate, 10% to 85% by weight of alkylacrylate, 10% to 85% dialkylfumarate, wherein the alkyl radicals contain from 1–10 carbon atoms.

References Cited

UNITED STATES PATENTS

| 2,418,688 | 4/1947 | Atwood. | |
| 2,725,308 | 11/1955 | Nickerson | 260—8851 |
| 2,912,413 | 11/1959 | Baer. | |
| 3,085,986 | 4/1963 | Muskat. | |
| 3,118,848 | 1/1964 | Lombardi et al. | 260—851 |
| 3,196,120 | 7/1965 | McLaughlin | 260—855 |
| 3,267,174 | 8/1966 | Fry et al. | 260—851 |
| 3,352,806 | 11/1967 | Hicks | 260—851 |

JOHN C. BLEUTGE, Primary Examiner

U.S. Cl. X.R.

117—132, 161; 260—31.2, 31.4, 32.4, 32.6, 32.8, 33.2, 33.4, 33.6, 41, 75, 78.5, 850, 851, 856